(12) United States Patent
Lee et al.

(10) Patent No.: US 10,814,535 B2
(45) Date of Patent: Oct. 27, 2020

(54) HYBRID SUSPENSION ARM

(71) Applicant: ILJIN CO., LTD., Gyeongju-si (KR)

(72) Inventors: Sung Keun Lee, Seoul (KR); Hyun Woo Kim, Guri-si (KR); Tae Sung Kwon, Gyeongju-si (KR); Byong Suk Yu, Gyeongju-si (KR); Se Woong Jeong, Ulsan (KR); Hyuk Kwon, Seoul (KR); Ig Jin Kwon, Gyeongju-si (KR); Young In Yoon, Ulsan (KR); Min Kook Park, Daegu (KR); Soon Chan Kwon, Gimcheon-si (KR); Dae Ju Lee, Daegu (KR)

(73) Assignee: ILJIN CO., LTD., Gyeongju-Si (KR)

( * ) Notice: Subject to any disclaimer, the term of this patent is extended or adjusted under 35 U.S.C. 154(b) by 208 days.

(21) Appl. No.: 16/066,942

(22) PCT Filed: Dec. 29, 2016

(86) PCT No.: PCT/KR2016/015513
§ 371 (c)(1),
(2) Date: Jun. 28, 2018

(87) PCT Pub. No.: WO2017/116183
PCT Pub. Date: Jul. 6, 2017

(65) Prior Publication Data
US 2019/0118437 A1    Apr. 25, 2019

(30) Foreign Application Priority Data

Dec. 30, 2015  (KR) .................. 10-2015-0189881
Nov. 2, 2016   (KR) .................. 10-2016-0145447

(51) Int. Cl.
*B29C 45/14*    (2006.01)
*F16C 11/06*    (2006.01)
(Continued)

(52) U.S. Cl.
CPC ........ *B29C 45/14* (2013.01); *B29C 45/14344* (2013.01); *B60G 7/001* (2013.01);
(Continued)

(58) Field of Classification Search
None
See application file for complete search history.

(56) References Cited

U.S. PATENT DOCUMENTS 5,556,081 A    9/1996  Miura et al.
5,662,348 A    9/1997  Kusama et al.
(Continued)

FOREIGN PATENT DOCUMENTS

JP    07-047826    2/1995
JP    07-251617    10/1995
(Continued)

OTHER PUBLICATIONS

International Search Report, issued in the corresponding PCT Application No. PCT/KR2016/015513, dated Jun. 22, 2017, 5 pages.
(Continued)

*Primary Examiner* — Drew J Brown
(74) *Attorney, Agent, or Firm* — Hamre, Schumann, Mueller & Larson, P.C.

(57) ABSTRACT

A hybrid lower arm and a hybrid upper arm include an arm body made of a metal material, and an insert injection-molded integrally with the arm body so that the insert is inserted into an inside of the arm body. The arm body has a weight ratio of 50% or more and 90% or less with respect to the total weight of the hybrid lower arm or the hybrid upper arm, thus achieving the rigidity increase as well as the weight reduction in the lower arm and the upper arm of a suspension system.

9 Claims, 7 Drawing Sheets

(51) Int. Cl.
*B60G 7/00* (2006.01)
*B29L 31/30* (2006.01)

(52) U.S. Cl.
CPC .............. *B60G 7/005* (2013.01); *F16C 11/06* (2013.01); *B29L 2031/30* (2013.01); *B60G 2204/143* (2013.01); *B60G 2204/148* (2013.01); *B60G 2204/41* (2013.01); *B60G 2204/416* (2013.01); *B60G 2204/418* (2013.01); *B60G 2206/014* (2013.01); *B60G 2206/12* (2013.01); *B60G 2206/122* (2013.01); *B60G 2206/124* (2013.01); *B60G 2206/7102* (2013.01); *B60G 2206/7104* (2013.01); *B60G 2206/72* (2013.01); *B60G 2206/73* (2013.01); *B60G 2206/81012* (2013.01); *B60G 2206/91* (2013.01)

(56) References Cited

U.S. PATENT DOCUMENTS

| | | | | |
|---|---|---|---|---|
| 7,556,273 | B2 * | 7/2009 | Streubel | B60G 7/001 |
| | | | | 264/261 |
| 7,938,417 | B2 | 5/2011 | Ersoy et al. | |
| 9,168,801 | B2 | 10/2015 | Dicke et al. | |
| 2004/0135337 | A1 * | 7/2004 | Alesso | B60G 7/001 |
| | | | | 280/124.134 |
| 2006/0175786 | A1 | 8/2006 | Streubel et al. | |
| 2010/0084834 | A1 | 4/2010 | Ersoy et al. | |
| 2010/0086346 | A1 * | 4/2010 | Kruse | B60G 7/001 |
| | | | | 403/122 |
| 2011/0133421 | A1 | 6/2011 | Jeong | |
| 2011/0133423 | A1 | 6/2011 | Jeong | |
| 2011/0133425 | A1 | 6/2011 | Jeong | |
| 2012/0315414 | A1 * | 12/2012 | Wesch | B60G 7/001 |
| | | | | 428/34.1 |
| 2015/0283595 | A1 * | 10/2015 | Haselhorst | B21D 22/26 |
| | | | | 156/196 |
| 2018/0154718 | A1 | 6/2018 | Kwon et al. | |
| 2018/0154719 | A1 * | 6/2018 | Kwon | F16C 11/06 |
| 2019/0030972 | A1 * | 1/2019 | Mainz | B60G 7/001 |
| 2019/0061452 | A1 * | 2/2019 | Lee | B60G 7/005 |
| 2019/0315173 | A1 * | 10/2019 | Kim | B60G 7/001 |
| 2019/0315174 | A1 * | 10/2019 | Kwon | B60G 3/02 |

FOREIGN PATENT DOCUMENTS

| | | |
|---|---|---|
| JP | H08197923 A | 8/1996 |
| JP | 08-318722 | 12/1996 |
| JP | H11115800 A | 4/1999 |
| JP | 2002205520 A | 7/2002 |
| JP | 2011-116336 A | 6/2011 |
| JP | 2011-116340 A | 6/2011 |
| JP | 2011-116342 A | 6/2011 |
| JP | 2018-514463 A | 6/2018 |
| KR | 10-2003-0088238 | 11/2003 |
| KR | 10-2009-0122978 | 12/2009 |
| KR | 20-2012-0003176 | 5/2012 |
| KR | 10-1393849 | 5/2014 |

OTHER PUBLICATIONS

The extended European search report issued in European Application No. 16882135.3, dated Aug. 6, 2019, 10 pages provided.

* cited by examiner

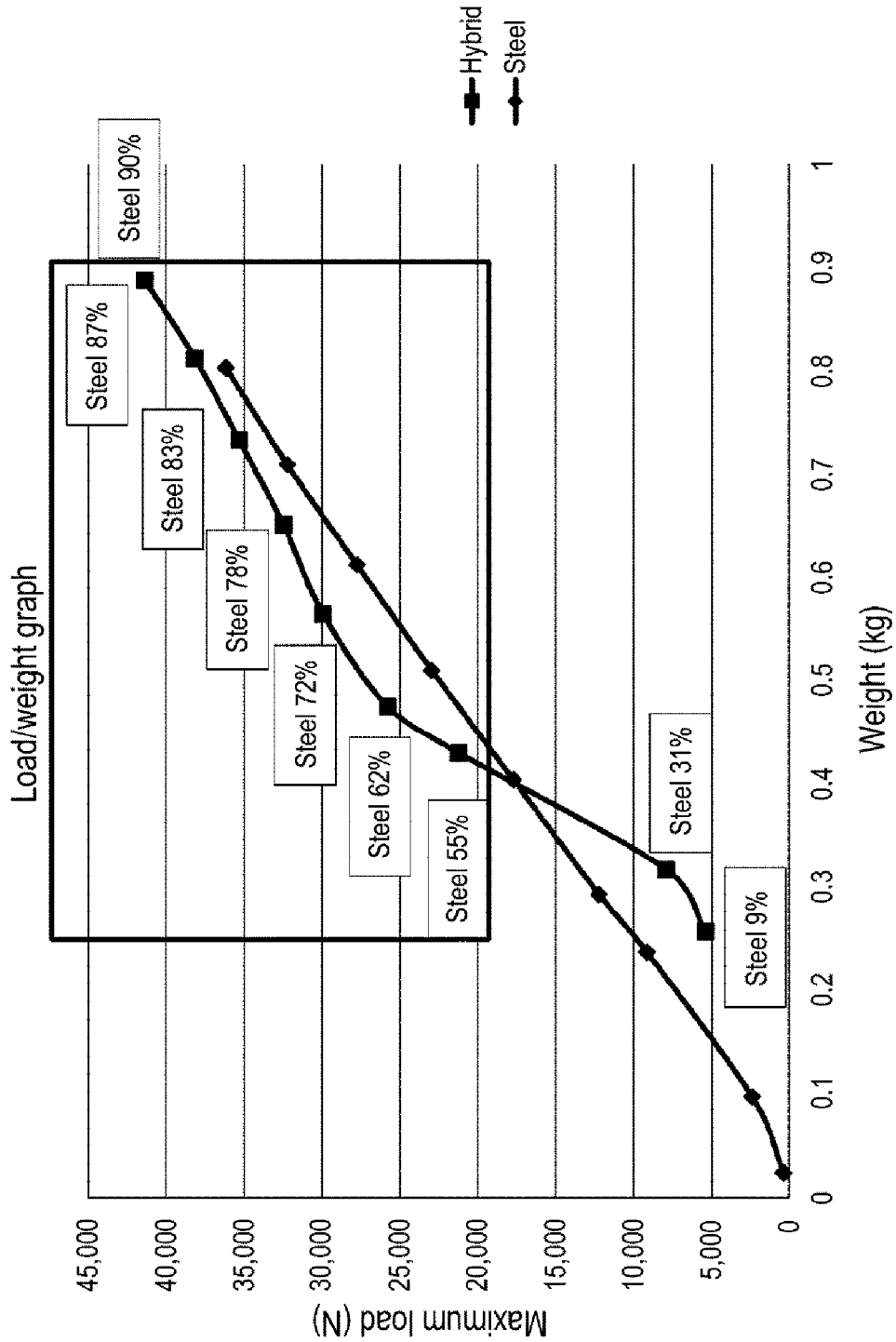

HYBRID SUSPENSION ARM

TECHNICAL FIELD

The present disclosure relates to a suspension arm of a vehicular suspension system. More particularly, the present disclosure relates to a vehicular hybrid suspension arm in which a vehicular suspension arm such as a lower control arm or an upper control arm is made of a composite material of plastic and steel.

BACKGROUND

In general, a vehicular suspension system is an apparatus which connects a wheel to a vehicular body. The vehicular suspension system includes a spring which absorbs vibration or impact transmitted from a road surface to a vehicular body, a shock absorber which adjusts an action of the spring, and a suspension arm or suspension link which controls an operation of the wheel.

By way of example, types of suspension systems for controlling the operation of a vehicular wheel include a swing arm type, a wishbone type, a McPherson strut type or the like. A suspension system using a wishbone type control includes a suspension arm (lower control arm) which connects a knuckle fastened to a vehicular wheel to a vehicular body. That is, one end of the suspension arm is connected to a cross member or a subframe which constitutes the vehicular body, while the other end of the suspension arm is connected to the knuckle via a ball joint. With this configuration, the suspension arm allows the vehicular wheel to be supported by the vehicular body, and appropriately controls the toe-in of the vehicular wheel in accordance with the running status of a vehicle, thereby improving the straight running performance and the steering stability of the vehicle.

The aforementioned suspension arm has been manufactured in a casting type method and a press type method. Specifically, according to the casting type method, the suspension arm is manufactured by being molded by pouring molten steel or molten aluminum into a metal mold and then solidifying the molten steel or aluminum. Further, according to the press type method, the suspension arm is manufactured by fabricating an upper plate and a lower plate from a steel plate made of a steel material by a press, and welding the upper plate and the lower plate.

However, in the aforementioned suspension arm manufacturing method, the suspension arm is fabricated from a steel casting, or the upper and lower plates are fabricated from a steel material by a press method and the upper and lower plates are welded thereafter. The foregoing methods are problematic since the weight of the suspension arm is heavy due to the characteristics of steel, a lot of manufacturing processes are required, and rigidity weakness and deformation may occur due to the welding of the steel plates.

SUMMARY

Various embodiments of the present disclosure provide a vehicular hybrid suspension arm made of a composite material to solve the problems of the steel-made or aluminum-made suspension arm and to achieve weight reduction.

Further, various embodiments of the present disclosure provide a vehicular hybrid suspension arm which can achieve increased rigidity as well as weight reduction.

A hybrid lower arm according to one embodiment of the present disclosure may include: a lower arm body made of a metal material; and an insert injection-molded integrally with the lower arm body so that the insert is inserted into an inside of the lower arm body. The lower arm body may have a weight ratio of 50% or more and 90% or less with respect to a total weight of the hybrid lower arm.

The lower arm body may be made of a steel material or an aluminum material.

A ball joint may be coupled to one end of the lower arm body. A first bush may be coupled to another end of the lower arm body. A second bush may be coupled to a corner portion of the lower arm body between the ball joint and the first bush.

The lower arm body may include a lower arm body plate having a flat plate shape, and first and second wall flanges which are continuously formed along edges of the lower arm body plate and are bent vertically with respect to the lower arm body plate.

A first end of the first wall flange and a first end of the second wall flange may be separated from each other to form a first coupling groove, and a ball joint pipe of the ball joint may be inserted into and integrally coupled to the first coupling groove. A second end of the first wall flange and a second end of the second wall flange may be separated from each other to form a second coupling groove, and a second bush pipe of the second bush may be inserted into and integrally coupled to the second coupling groove.

A first bush pipe flange for mounting the first bush may be formed integrally with the lower arm body plate.

A bent flange bent toward the inside of the lower arm body may be formed integrally with an upper end of each of the first and second wall flanges.

At least one through hole may be formed in the lower arm body plate, and a coupling protrusion of the insert may fill in the through hole and protrude.

The insert may include: an insert body shaped so as to correspond to a shape of the lower arm body plate; first and second rim flanges formed to extend vertically along rims of the insert body and having a shape corresponding to the first and second wall flanges respectively; and a plurality of reinforcement ribs connecting and reinforcing the first and second rim flanges and the insert body.

First ends of the first and second rim flanges may surround at least a portion of the ball joint pipe of the ball joint.

Second ends of the first and second rim flanges may integrally connect with each other and may be coupled to a portion of the second bush pipe of the second bush.

The first rim flange may be formed to surround the first bush pipe flange.

The plurality of the reinforcement ribs may connect the first and second rim flanges and the insert body.

The plurality of the reinforcement ribs may be formed in a lattice-patterned shape.

A hybrid upper arm according to another embodiment of the present disclosure may include: an upper arm body made of a metal material; and an insert inserted into and coupled to an inside of the upper arm body. The upper arm body may have a weight ratio of 50% or more and 90% or less with respect to a total weight of the hybrid upper arm.

A coupling flange may be formed in the upper arm body so as to be bent inward in a width direction of the upper arm body.

The coupling flange may be inserted into and coupled to the insert.

The upper arm body may include two leg portions and a joint portion integrally connecting the two leg portions.

A bush pipe may be coupled to a leading end portion of each of the two leg portions by welding, and a ball joint pipe may be coupled to a leading end portion of the joint portion by welding.

The ball joint pipe may be located in a central portion between the bush pipes. The bush pipes may be disposed to be opened in a horizontal direction, and the ball joint pipe may be disposed to be opened in a vertical direction.

Bushes may be force-fitted into and coupled to the bush pipes respectively, and a ball joint may be force-fitted into and coupled to the ball joint pipe.

At least one hole may be formed through the upper arm body. At least one coupling protrusion, which is inserted into and fills in the at least one hole and is enlarged up to a peripheral edge of the at least one hole, may be formed in the insert.

The upper arm body may include two leg portions and a joint portion integrally connecting the two leg portions. The insert may include two leg portions and a joint portion integrally connecting the two leg portions. The at least one hole may include at least one small-diameter hole disposed in each of the two leg portions at predetermined spacings along a longitudinal direction. The at least one coupling protrusion may be inserted into and fill in the at least one small-diameter hole and may be formed in a size radially enlarged up to a peripheral edge of the at least one small-diameter hole.

The at least one small-diameter hole may include two or more small-diameter holes disposed adjacent to each other. At least one middle-diameter hole having a relatively large diameter may be formed between the two or more small-diameter holes. A portion of the insert may be inserted into the middle-diameter hole such that a middle-diameter coupling rim radially enlarged up to a peripheral edge of the middle-diameter hole is formed in the insert.

The at least one hole may include a large-diameter hole formed in the joint portion of the upper arm body. A portion of the insert may be inserted into the large-diameter hole such that a large-diameter coupling rim radially enlarged up to a peripheral edge of the large-diameter hole is formed in the insert.

At least one reinforcement rib having a lattice-patterned shape may be protrudingly formed integrally with the insert.

In the hybrid suspension arm according to one embodiment of the present disclosure, the insert made of a lightweight plastic material is integrally coupled to the suspension arm body made of a metal material. Thus, when compared with the suspension arm of a prior art which is made of a steel material or an aluminum material, the hybrid suspension arm can effectively increase overall rigidity while being relatively light weight.

Where the above-described hybrid suspension arm is applied to a vehicle, the driving stability and the durability of the vehicle can be improved due to the increase in rigidity, and improved fuel efficiency of the vehicle can be achieved due to the weight reduction.

BRIEF DESCRIPTION OF THE DRAWINGS

FIG. 9 is a graph showing maximum loads versus weights in the hybrid suspension arms according to various embodiments of the present disclosure.

DETAILED DESCRIPTION

Figure 1:
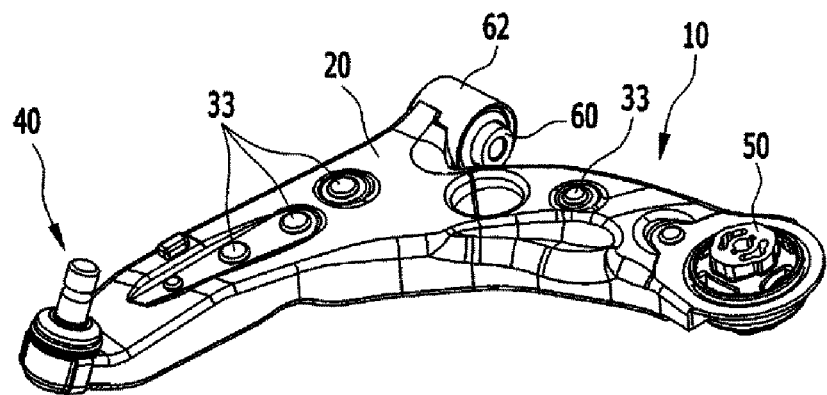
FIG. 1 is a perspective view showing a hybrid lower arm according to one embodiment of the present disclosure.

Embodiments of the present disclosure are illustrated for the purpose of explaining the technical idea of the present disclosure. The scope of the rights according to the present disclosure is not limited to the embodiments presented below or the detailed descriptions of such embodiments.

All technical and scientific terms used in the present disclosure have the meaning generally understood by those of ordinary skill in the art to which the present disclosure pertains, unless otherwise defined. All terms used in the present disclosure are chosen for the purpose of more clearly describing the present disclosure and are not chosen to limit the scope of rights according to the present disclosure.

As used in the present disclosure, expressions such as "comprising", "including", "having", and the like are to be understood as open-ended terms having the possibility of encompassing other embodiments, unless otherwise mentioned in the phrase or sentence containing such expressions.

The singular form described in the present disclosure may include a plural meaning, unless otherwise mentioned. This applies equally to the singular form recited in the claims.

In the present disclosure, where it is mentioned in the present disclosure that one element is "connected" to another element, it is to be understood that said one element may be directly connected to said another element, or may be connected to said another element via a new additional element.

Hereinafter, descriptions are made as to embodiments of the present disclosure with reference to the accompanying drawings. In the accompanying drawings, the same or corresponding elements are denoted by the same reference numerals. In the following descriptions of the embodiments, descriptions of the same or corresponding elements may be omitted. However, even if the descriptions of elements are omitted, it is not intended that such elements are not included in a certain embodiment.

For ease of explanation, the left side in the drawings is referred to as "one side", "one end", "one end portion" or the like name, while the right side in the drawings is referred to as "the other side", "the other end", "the other end portion" or the like name.

The hybrid suspension arm described below may include a hybrid lower arm 10 and a hybrid upper arm 100.

Figure 2:
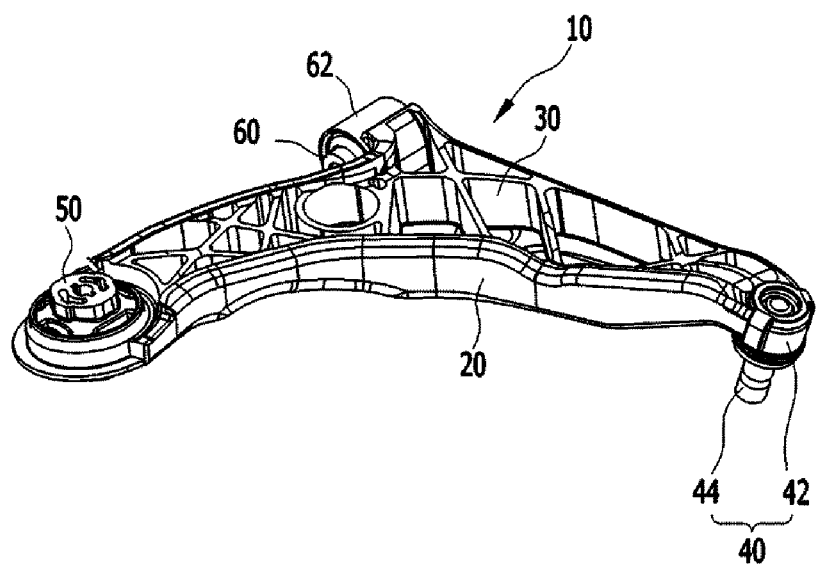
FIG. 2 is a perspective view showing an underside of the hybrid lower arm according to one embodiment of the present disclosure.

FIG. 1 is a perspective view showing a hybrid lower arm 10 according to one embodiment, and FIG. 2 is a perspective view showing an underside of the hybrid lower arm 10 according to one embodiment.

The hybrid lower arm 10 may include a lower arm body 20 which is made of a metal material such as steel or aluminum, and an insert 30 which is injection-molded with a plastic material and integrally coupled to the lower arm body 20 by injection molding.

The hybrid lower arm 10 may have a generally L-like shape as a whole. A ball joint 40 may be mounted to one end of the hybrid lower arm 10, and a first bush 50 may be coupled to the other end of the hybrid lower arm 10. A second bush 60 may be coupled to a corner portion between the ball joint 40 and the first bush 50.

The ball joint 40 may include a cylindrical ball joint pipe 42, and a ball stud 44 which is received in and rotatably supported by the ball joint pipe 42. The ball joint 40 may serve to relatively rotatably connect the hybrid lower arm 10 to a knuckle (not shown). The first and second bushes 50, 60 may serve to elastically connect the hybrid lower arm 10 to a vehicular body.

Figure 3:
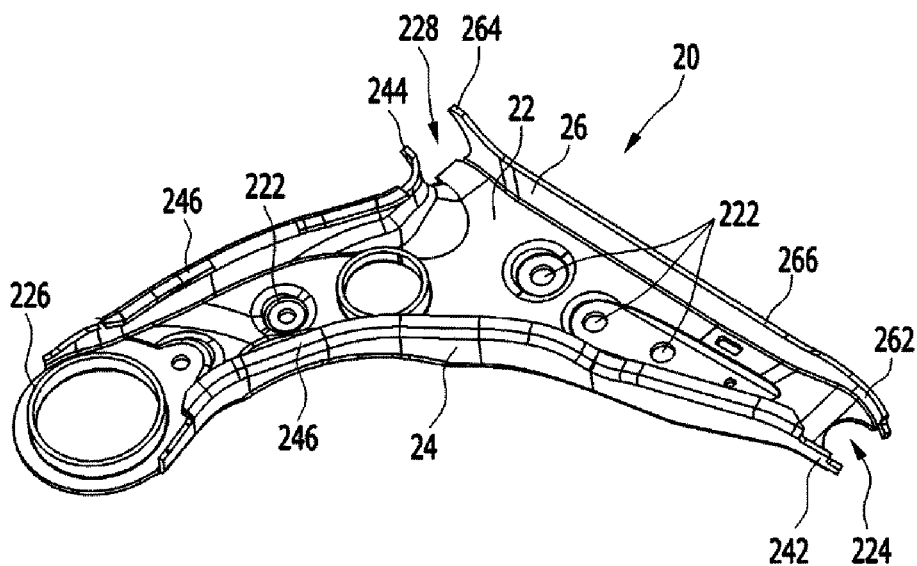
FIG. 3 is a perspective view of a metal material-made lower arm body of the hybrid lower arm according to one embodiment of the present disclosure.

FIG. 3 is a perspective view of a metal material-made lower arm body 20 of the hybrid lower arm 10 according to one embodiment.

When the lower arm body 20 is made of, for example, a steel material, the lower arm body 20 may be formed from a high tensile steel plate for a vehicle by a press method.

The lower arm body 20 may include a lower arm body plate 22 which has a generally flat plate shape, and wall flanges 24, 26 which are generally vertically bent along edges of the lower arm body plate 22.

Referring to FIG. 1, one or more through holes 222 are formed through the lower arm body plate 22, and coupling protrusions 33 of the insert 30 described below can fill in the through holes 222 respectively and can further protrude radially outward toward the edges of the lower arm body plate 22. The through holes 222 and the coupling protrusions 33 may improve the coupling rigidity of the lower arm body 20 and the insert 30.

The wall flanges 24, 26 may include a first wall flange 24 which integrally connects from one end of the lower arm body plate 22 via the other end to the corner portion, and a second wall flange 26 which integrally connects from the corner portion to the other end. The first wall flange 24 and the second wall flange 26 may have a configuration in which they do not connect with each other.

Referring to FIG. 2, the ball joint pipe 42 may be integrally coupled to one end of the lower arm body 20 by, for example, welding. A circular-arc-shaped coupling groove 224 for insertion of the ball joint pipe 42 may be formed at one end of the lower arm body plate 22. In the state where the ball joint pipe 42 is inserted into the coupling groove 224, the ball joint pipe may be coupled to the lower arm body plate 22 and one ends 242, 262 of the first and second wall flanges 24, 26 by welding.

A first bush pipe flange 226 may be formed at the other end of the lower arm body plate 22, and the first bush 50 may be coupled to the first bush pipe flange 226 by, for example, force-fitting.

The other end 244 of the first wall flange 24 and the other end 264 of the second wall flange 26 may be formed in a generally circular arc shape at the corner portion, forming a second coupling groove 228. In the state where a second bush pipe 62 of the second bush 60 is inserted into the second coupling groove 228, the second bush pipe 62 may be coupled, by welding, to the other end 244 of the first wall flange 24, the other end 264 of the second wall flange 26 and the lower arm body plate 22.

Bent flanges 246, 266, which are bent toward the inside of the lower arm body 20, may be formed integrally with the respective upper ends of the first wall flange 24 and the second wall flange 26. Each of the bent flanges 246, 266 may improve the coupling force between the lower arm body 20 and the insert 30.

Figure 4:
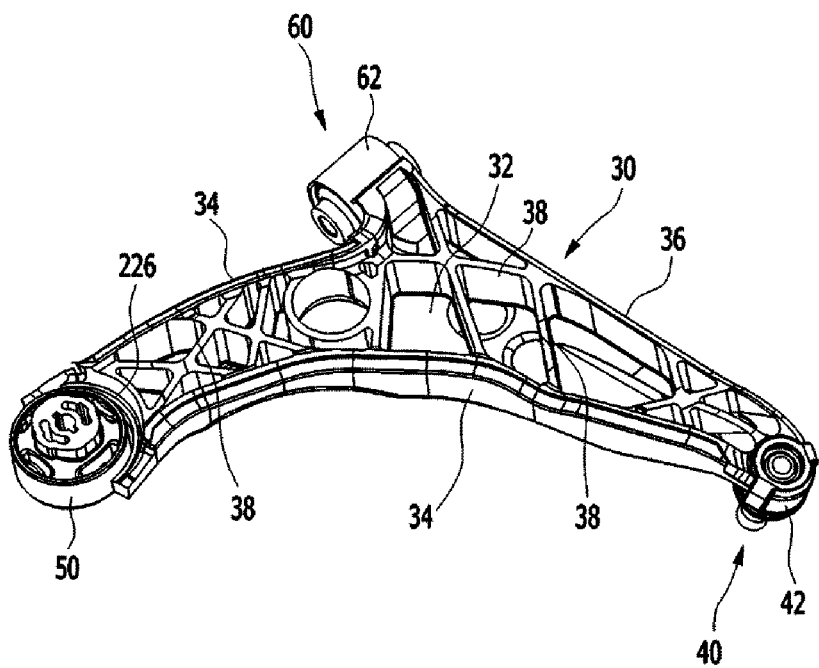
FIG. 4 is a perspective view of an insert of the hybrid lower arm, which is injected with a plastic material, according to one embodiment of the present disclosure.

FIG. 4 is a perspective view of the insert 30 of the hybrid lower arm 10, which is injected with a plastic material, according to one embodiment.

The insert 30 may be inserted into the inside of the lower arm body 20 and may be integrally coupled to the lower arm body 20 when the insert 30 is injection-molded.

The weight of the lower arm body 20 may have a weight ratio of 50% or more (at minimum) and 90% or less (at maximum) with respect to the total weight of the hybrid lower arm 10.

The insert 30 may include: an insert body 32 which has a generally L-like shape as a whole and is shaped so as to correspond to the shape of the lower arm body 20; first and second rim flanges 34, 36 which are formed to extend generally vertically along a rim of the insert body 32 and have shapes corresponding to the first and second reinforcement flanges 24, 26 respectively; and a plurality of reinforcement ribs 38 which connect and reinforce the first and second rim flanges 34, 36 and the insert body 32.

One end of the first rim flange 34 and one end of the second rim flange 35 may be formed to surround a portion of the ball joint pipe 42. The first rim flange 34 may be formed to surround the first bush pipe flange 226. The other end of the first rim flange 34 and the other end of the second rim flange 35 may be formed so that the other end of the first rim flange and the other end of the second rim flange are coupled to a portion of the second bush pipe 62 in the state where they integrally connect with each other.

A plurality of the reinforcement ribs 38 may be formed in an intersecting manner, for example, in a lattice-patterned shape, to connect and reinforce the first and second rim flanges 34, 36 and the insert body 32. Since the insert 30 includes a plurality of the reinforcement ribs 38 as described above, the structural rigidity of the insert can increase, and the weight of the insert 30 can be reduced due to a plurality of empty spaces existing between the reinforcement ribs 38.

Figure 5:
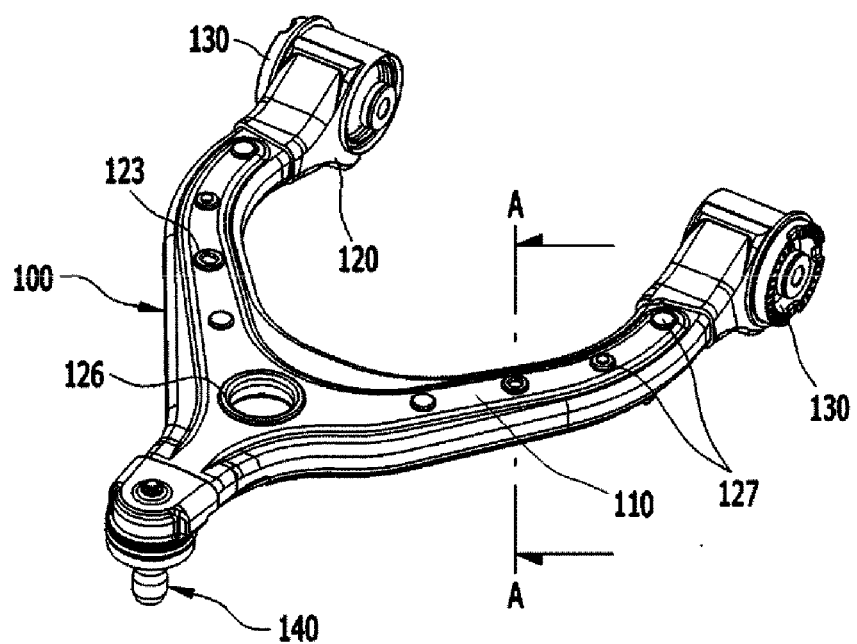
FIG. 5 is a perspective view of a vehicular hybrid upper arm according to another embodiment of the present disclosure.
Figure 6:
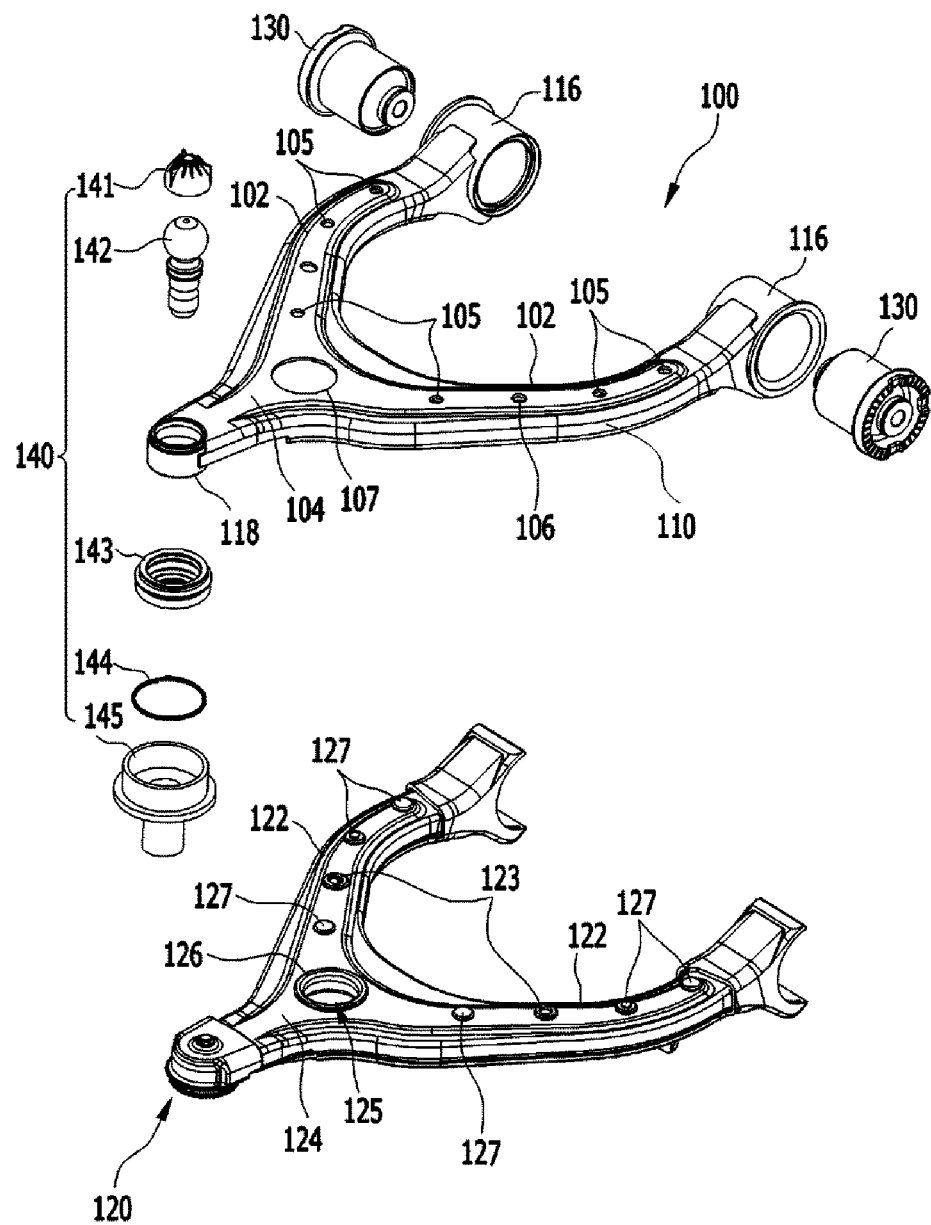
FIG. 6 is an exploded perspective view of the vehicular hybrid upper arm according to another embodiment of the present disclosure.

FIG. 5 is a perspective view of a vehicular hybrid upper arm 100 according to another embodiment. FIG. 5 is an exploded perspective view of the vehicular hybrid upper arm 100 according to another embodiment.

The vehicular hybrid upper arm 100 according to another embodiment may include an upper arm body 110 which can be fabricated from a metal material such as steel or aluminum by a general press method. The upper arm body 110 may include two leg portions 102 and a joint portion 104 integrally connecting the two leg portions 102.

A bush pipe 116 may be coupled, by welding, to each of leading end portions of the two leg portions 102. A ball joint pipe 118 may be coupled, by welding, to a leading end portion of the joint portion 104. Generally semicylindrical coupling holes may be formed at the leading end portion of each of the two leg portions 102 and at the leading end portion of the joint portion 104. Each pipe 116, 118 may be fitted in shape to the coupling hole and be coupled, by welding, to the coupling hole.

The ball joint pipe 118 may be located in a central portion between the bush pipes 116. Further, the bush pipes 116 may be disposed to be opened in the horizontal direction, while the ball joint pipe 118 may be disposed to be opened in the vertical direction. Bushes 130 may be force-fitted into the respective two bush pipes 116. The respective bushes 130 may be fastened to a vehicular body with a bolt or the like.

A ball joint 140 may be force-fitted into and coupled to the ball joint pipe 118. The ball joint 140 may include: a ball stud 142; a ball bearing 141 which surrounds and rotatably supports the ball stud; a dust cover 143 which surrounds the ball stud 142 to prevent intrusion of foreign matters; a ring clip 144 for assembling the dust cover 143 to the ball stud 142; and a protector 45 covered on the ball stud 142.

A large-diameter hole 107 having a relatively large diameter may be formed through the joint portion 104. A plurality of middle-diameter holes 106 and a plurality of small-diameter holes 105, which have a relatively small size, may be disposed in each leg portion 102 with predetermined spacings along a longitudinal direction of the leg portion. The middle-diameter holes 106 may be disposed between the small-diameter holes 105. The number of the middle-diameter holes 106 and the small-diameter holes 105 may be appropriately adjusted as needed.

An insert 120, which is injection-molded with a plastic material and is integrally coupled to the upper arm body 110 by injection molding, may be provided inside the upper arm body 110. A weight of the upper arm body 110 may have a weight ratio of 50% or more (at minimum) and 90% or less (at maximum) with respect to the total weight of the hybrid upper arm 100.

The insert 120 may have a shape approximately similar to that of the upper arm body 110. That is, the insert may include two leg portions 122 and a joint portion 124. A large-diameter hole 125 may be formed through the joint portion 124.

A large-diameter coupling rim 126, which is enlarged in a thickness direction and a radial direction, may be formed at an edge of the large-diameter hole 125 of the joint portion 124. The large-diameter coupling rim 126 may be formed to be disposed along a peripheral edge of the large-diameter hole 107 of the upper arm body 10 when the plastic insert 120 is injected. Thus, the large-diameter coupling rim may increases the coupling force between the upper arm body 110 and the insert 120 such that the insert 120 coupled to the inside of the upper arm body 110 is not separated from the upper arm body 110.

A plurality of coupling protrusions 127 may be formed in each of the leg portions 122 of the insert 120 at predetermined spacings along a longitudinal direction. When the insert 120 is injected, each of the coupling protrusions 127 may be inserted into and fill in the small-diameter hole 105 formed in each leg portion 102 of the upper arm body 110, and may be formed in a size radially enlarged up to a peripheral edge of the small-diameter hole 105. Each of the coupling protrusions 127 may also improve the coupling force between the upper arm body 110 and the insert 120.

A middle-diameter coupling rim 123 formed between the two coupling protrusions 127 may be formed so as to be radially enlarged up to a peripheral edge of the middle-diameter hole 106 formed in each leg portion 102 of the upper arm body 110 when the insert 120 is injected. Thus, the middle-diameter coupling rim 123 may improve the coupling force between the upper arm body 110 and the insert 120.

Figure 7:
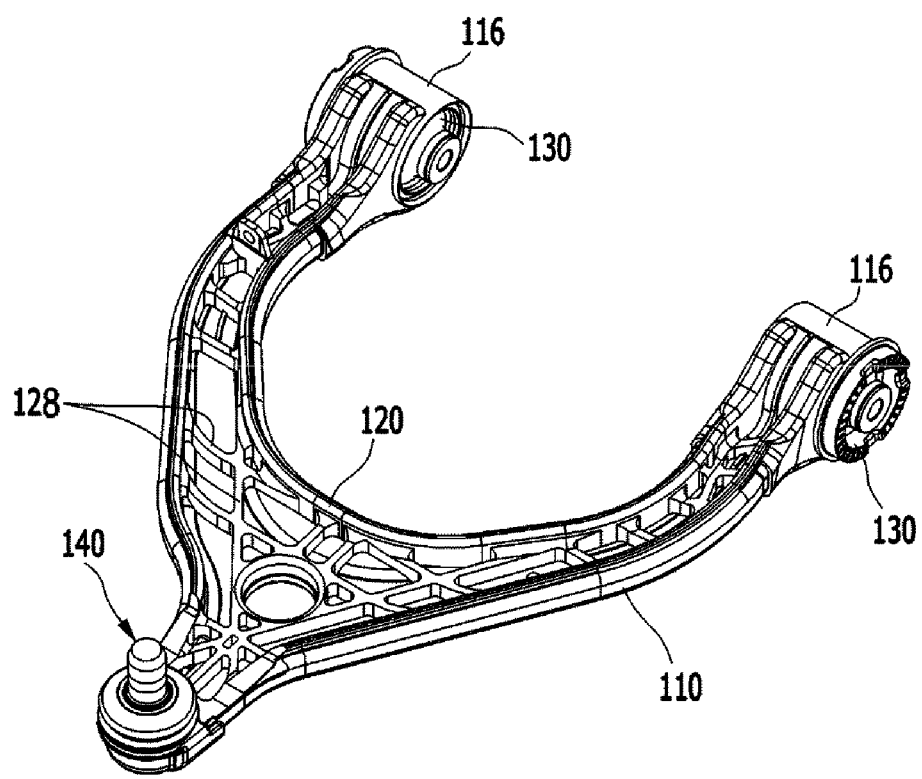
FIG. 7 is a perspective view showing an underside of the vehicular hybrid upper arm according to another embodiment of the present disclosure.

FIG. 7 is a perspective view showing an underside of the vehicular hybrid upper arm 100 according to another embodiment. Referring to FIG. 7, at least one reinforcement rib 128 having a generally lattice-patterned shape may be protrudingly formed integrally with the insert 120.

Figure 8:
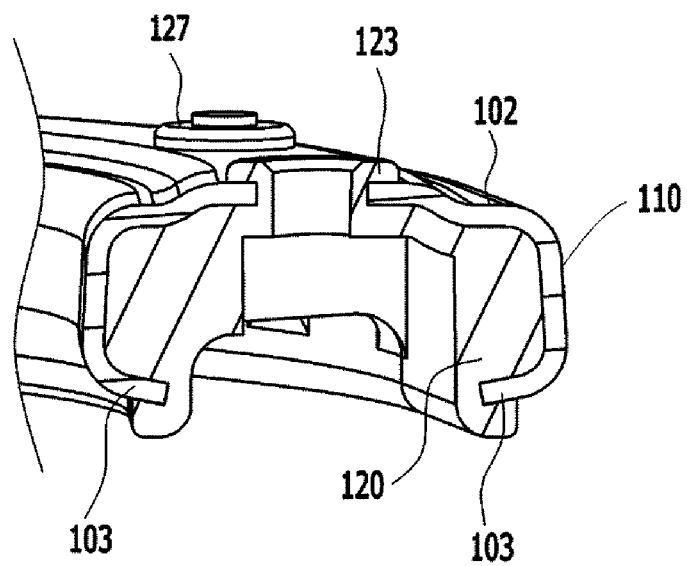
FIG. 8 is a sectional view taken along a line A-A in FIG. 5.

FIG. 8 is a sectional view taken along a line A-A in FIG. 5. Referring to FIG. 8, the upper arm body 110 may include two coupling flanges 103 which are bent inward in a width direction of the upper arm body along edges of the upper arm body.

The two coupling flanges 103 may be formed to face each other. The two coupling flanges 103 may be inserted into the inside of the insert 120 when the insert 120 is injected, thereby improving the coupling force between the upper arm body 110 and the insert 120.

FIG. 9 is a graph showing maximum loads versus weights in the hybrid suspension arms according to various embodiments. The X axis represents the weights (unit: kg) of the hybrid suspension arms, and the Y axis represents the maximum loads (unit: N) which the materials of the hybrid suspension arms can withstand without being buckled.

The line labeled by "Steel" indicates a case where the suspension arm is entirely made of a steel material, and the line labeled by "Hybrid" indicates a case where the hybrid suspension arm is comprised of two types of steel and plastic insert according to embodiments.

When using the hybrid suspension arm having a composite material of metal and plastic, the weight can be reduced in comparison with a steel-made suspension arm which can withstand the same maximum load. When the proportion of the plastic insert exceeds a certain level, i.e., when the proportion of steel is lowered, even if the total weight of the hybrid suspension arm increases, the maximum load which the hybrid suspension arm can withstand may be lowered in comparison with a general steel-made suspension arm.

Referring to the graph of FIG. 9, it can be ascertained that, when the ratio of steel in the hybrid suspension arm is within 50% to 90% (within the range in a box) with respect to the total load at the same weights in the X axis, the maximum load of the hybrid suspension arm is higher than that of the steel-made suspension arm.

Therefore, in the above-described embodiments, the lower arm body 20 or the upper arm body 110 may preferably have the weight ratio of 50% or more and 90% or less with respect to the total weight of the hybrid suspension arm. More preferably, the lower arm body 20 or the upper arm body 110 may have the weight ratio of 55% or more and 78% or less with respect to the total weight of the hybrid suspension arm.

The technical idea of the present disclosure has been described heretofore with reference to some embodiments and examples shown in the accompanying drawings. However, it is to be understood that various substitutions, modifications and alterations may be made without departing from the technical idea and scope of the present disclosure that can be understood by those of ordinary skill in the technical field to which the present disclosure pertains. Further, it is to be understood that such substitutions, modifications and alterations fall within the appended claims.

What is claimed is:

1. A hybrid upper arm, comprising:
   an upper arm body made of a metal material, the upper wall including:
      an upper wall, and
      two side walls extending downward from the upper wall; and
      wherein the upper arm body has a weight ratio of 50% or more and 90% or less with respect to a total weight of the hybrid upper arm; and
   an insert injection-molded integrally with the upper arm body so that the insert is inserted into an inside of the upper arm body,
      wherein the insert is made of a plastic material and supports the upper arm body, wherein the insert includes:
an upper wall and two side walls extending downward from the upper wall of the insert,
a reinforcement rib that is disposed in a space surrounded by the upper wall and the side walls corresponding to the insert and supports the upper wall and the side walls corresponding to the insert, the reinforcement rib including:
a first portion having a constant vertical length, and
a second portion that is disposed between the first portion and the side walls of the insert and has a vertical length gradually increasing from the first portion toward the side walls of the insert,
wherein both ends of the reinforcement rib are coupled to the side walls corresponding to the insert respectively and connect the side walls of the insert to each other,
wherein a vertical length of the reinforcement rib is less than vertical lengths of the side walls corresponding to the insert, and
wherein the upper wall and the side walls corresponding to the insert are coupled to the upper wall and the side walls corresponding to the upper arm body respectively.

2. The hybrid upper arm of claim 1, wherein a coupling flange is formed in the upper arm body so as to be bent inward in a width direction of the upper arm body, and
wherein the coupling flange is inserted into and coupled to the insert.

3. The hybrid upper arm of claim 1, wherein the upper arm body includes two leg portions and a joint portion integrally connecting the two leg portions,
wherein a bush pipe is coupled to a leading end portion of each of the two leg portions by welding,
wherein a ball joint pipe is coupled to a leading end portion of the joint portion by welding,
wherein bushes are force-fitted into and coupled to the bush pipes respectively, and
wherein a ball joint is force-fitted into and coupled to the ball joint pipe.

4. The hybrid upper arm of claim 3, wherein the ball joint pipe is located in a central portion between the bush pipes,
wherein the bush pipes are disposed to be opened in a horizontal direction, and
wherein the ball joint pipe is disposed to be opened in a vertical direction.

5. The hybrid upper arm of claim 1, wherein at least one hole is formed through the upper arm body, and
wherein at least one coupling protrusion is formed in the insert, the at least one coupling protrusion being inserted into and filling in the hole and being enlarged up to a peripheral edge of the hole.

6. The hybrid upper arm of claim 5, wherein the upper arm body includes two leg portions and a joint portion integrally connecting the two leg portions,
wherein the insert includes two leg portions and a joint portion integrally connecting the two leg portions,
wherein the at least one hole includes at least one small-diameter hole disposed in each of the two leg portions at predetermined spacings along a longitudinal direction, and
wherein the at least one coupling protrusion is inserted into and fills in the at least one small-diameter hole and is formed in a size radially enlarged up to a peripheral edge of the at least one small-diameter hole.

7. The hybrid upper arm of claim 6, wherein the at least one small-diameter hole includes two or more small-diameter holes disposed adjacent to each other,
wherein at least one middle-diameter hole having a diameter relatively larger than that of the small-diameter hole is formed between the two or more small-diameter holes, and
wherein a portion of the insert is inserted into the middle-diameter hole such that a middle-diameter coupling rim radially enlarged up to a peripheral edge of the middle-diameter hole is formed in the insert.

8. The hybrid upper arm of claim 7, wherein the at least one hole includes a large-diameter hole formed in the joint portion of the upper arm body, and
wherein a portion of the insert is inserted into the large-diameter hole such that a large-diameter coupling rim radially enlarged up to a peripheral edge of the large-diameter hole is formed in the insert.

9. The hybrid upper arm of claim 1, wherein at least one reinforcement rib having a lattice-patterned shape is protrudingly formed integrally with the insert.

* * * * *